US010712902B2

(12) United States Patent
Andreae et al.

(10) Patent No.: US 10,712,902 B2
(45) Date of Patent: Jul. 14, 2020

(54) AUGMENTED REALITY SYSTEM FOR CONVEYOR SYSTEM AND METHOD (71) Applicant: SST Systems, Inc., Sturgeon Bay, WI (US)

(72) Inventors: Chad Martin Andreae, Sturgeon Bay, WI (US); Jarrod G. Parks, Brussels, WI (US); Amy Barnard, Sturgeon Bay, WI (US); Robert G. Rock, Sturgeon Bay, WI (US)

(73) Assignee: SST Systems, Inc., Sturgeon Bay, WI (US)

( * ) Notice: Subject to any disclaimer, the term of this patent is extended or adjusted under 35 U.S.C. 154(b) by 0 days.

(21) Appl. No.: 16/036,250

(22) Filed: Jul. 16, 2018

(65) Prior Publication Data
US 2019/0018569 A1  Jan. 17, 2019

Related U.S. Application Data (60) Provisional application No. 62/532,555, filed on Jul. 14, 2017.

(51) Int. Cl.
G06F 3/0481 (2013.01)
B65G 43/08 (2006.01)
(Continued)

(52) U.S. Cl.
CPC ......... G06F 3/04815 (2013.01); B65G 43/08 (2013.01); G02B 27/017 (2013.01);
(Continued)

(58) Field of Classification Search
CPC .. G06F 3/04815; G06F 3/04817; G06F 3/147; G06F 3/04847; G06F 3/011;
(Continued)

(56) References Cited

U.S. PATENT DOCUMENTS 7,712,662 B2  5/2010  Rock
8,066,185 B2  11/2011  Rock
(Continued)

OTHER PUBLICATIONS

Hidden Creative "The Future of Augmented Reality" https://www.youtube.com/watch?v=tnRJaHZH9lo, published Dec. 1, 2010.
(Continued)

Primary Examiner — Maurice L. McDowell, Jr.
Assistant Examiner — Donna J. Ricks
(74) Attorney, Agent, or Firm — Michael Best & Friedrich LLP (57) ABSTRACT An augmented reality system includes a display device defining a display area, a database containing a three-dimensional model of a conveyor system, a communication link between the database and the display device, and a processor. The processor is operable to display the three-dimensional model of the conveyor system on the display area. The display allows a human user to see a real time combined view of the real physical environment, including a building and features thereof, and the three-dimensional model of the factory automation system within the building. A user interface has controls operable to effect one or both of: movement of the displayed conveyor system within the building, and measurement between features of the building and the displayed conveyor system.

18 Claims, 4 Drawing Sheets (51) Int. Cl.
  *G02B 27/01* (2006.01)
  *G06T 19/00* (2011.01)
  *G06F 3/01* (2006.01)
  *G06F 3/0484* (2013.01)
  *G06F 3/147* (2006.01)

(52) U.S. Cl.
  CPC .......... *G06F 3/011* (2013.01); *G06F 3/04817* (2013.01); *G06F 3/04847* (2013.01); *G06T 19/006* (2013.01); *G02B 2027/014* (2013.01); *G05B 2219/32014* (2013.01); *G06F 3/147* (2013.01); *G06K 2209/19* (2013.01)

(58) Field of Classification Search
  CPC ................ G06T 19/006; G02B 27/017; G02B 2027/014; G05B 2219/32014; G06K 2209/19; B65G 43/08
  See application file for complete search history.

(56) References Cited

U.S. PATENT DOCUMENTS

| | | | |
|---|---|---|---|
| 8,376,230 B2 | 2/2013 | Rock | |
| 8,505,712 B2 | 8/2013 | Andreae et al. | |
| 8,701,993 B2 | 4/2014 | Rock | |
| 9,016,464 B2 | 4/2015 | Andreae et al. | |
| 9,409,730 B2 | 8/2016 | Andreae et al. | |
| 9,468,944 B2 | 10/2016 | Andreae et al. | |
| 9,646,574 B2 * | 5/2017 | Hoellwarth | G02B 27/017 |
| 2015/0161808 A1 * | 6/2015 | Oya | G05B 19/0426 345/633 |
| 2017/0165841 A1 * | 6/2017 | Kamoi | B25J 9/1697 |
| 2018/0131907 A1 * | 5/2018 | Schmirler | H04N 7/181 |
| 2018/0374265 A1 * | 12/2018 | Yamada | G06T 19/006 |

OTHER PUBLICATIONS

Alexander George "Lockheed Is Using These Augmented Reality Glasses to Build Fighter Jets", Popular Mechanics hittp://www.popularmechanics.com/flight/a13967/lockheed-martin-augmented-reality-f-35/, published Feb. 6, 2015.

Goldman, David "Google unveils 'Project Glass' virtual-reality glasses", CNNMoney Tech., Published Apr. 4, 2012.

Gadget Inspiration "7 Best AR Smart Glasses (Augmented Reality Smart Glasses)" https://www.youtube.com/watch?v=0i4v0Texqco, Published on Dec. 23, 2016.

* cited by examiner

AUGMENTED REALITY SYSTEM FOR CONVEYOR SYSTEM AND METHOD

CROSS-REFERENCE TO RELATED APPLICATIONS

This application claims priority to U.S. Provisional Patent Application No. 62/532,555, filed Jul. 14, 2017, the entire contents of which are incorporated by reference herein.

BACKGROUND

Virtual reality and augmented reality equipment has become increasingly available and affordable. However, the majority of the systems are designed for and operated primarily to provide entertainment. Therefore, opportunities exist for using the tools of these technologies in ways that provide industrial utility

SUMMARY

In one aspect, the invention provides an augmented reality system includes a display device defining a display area, a database containing a three-dimensional model of a conveyor system, a communication link between the database and the display device, and a processor. The processor is operable to display the three-dimensional model of the conveyor system on the display area. The display allows a human user to see a real time combined view of the real physical environment, including a building and features thereof, and the three-dimensional model of the factory automation system within the building. A user interface has controls operable to effect one or both of: movement of the displayed conveyor system within the building, and measurement between features of the building and the displayed conveyor system.

In another aspect, the invention provides a method of operating an augmented reality system in a building. A display device is provided to a human user in the building, the display device defining a display area. A three-dimensional model of a conveyor system is displayed to the human user, while simultaneously allowing the human user to see real physical features of the building in real time to give the impression that the conveyor system is installed in the building. Displaying the three-dimensional model of the conveyor system includes presenting a conveyor system control panel. In response to a command from the user via an input to a user interface, virtual operation of the displayed conveyor system is started.

In yet another aspect, the invention provides a method of operating an augmented reality system in a building. A display device is provided to a human user in the building, the display device defining a display area. A three-dimensional model of a conveyor system is displayed to the human user, while simultaneously allowing the human user to see real physical features of the building in real time to give the impression that the conveyor system is installed in the building. With a user interface, a measurement between the three-dimensional model and at least one utility feature of the building is performed and/or a movement of at least a portion of the displayed three-dimensional model to a new position within the building is performed.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

The present application relates to industrial conveyor system design and corresponding construction or installation at a factory site, for example an industrial building. In particular, the invention provides an augmented reality system operable to display and enable selective interaction with a virtual model of one or more conveyor systems for the manufacture, transit, painting, coating/finishing, thermal treatment, etc. of parts, which may include any type of industrial work piece. Such conveyor systems may provide for lateral transport, lifting/lowering, and/or changing the inclination of conveyed parts throughout one or more work stations of a factory. Work stations can include forming stations, cutting stations, welding stations, cleaning stations, spray booths, ovens, dip coating tanks and other known types of work stations utilized for the factory to convert raw materials or other starting work products to finished or semi-finished work products. Non-limiting examples of conveyor systems and work stations can be found throughout the following patents of SST Systems, Inc.: U.S. Pat. Nos. 9,468,944, 7,712,662, 8,066,185, 8,376,230, 8,701,993, 8,505,712, 9,016,464, and 9,409,730, although the invention is not necessarily limited to the types of conveyors and work stations disclosed therein. Aspects of the present invention can also be applied to other types of systems, including (by way of example only) water and wastewater treatment systems.

In one construction, an augmented reality (AR) system 100 includes a memory device, or "database", 104 having electronic storage media for holding data representing a three-dimensional model of a conveyor system. The AR system 100 further includes a processor 108, a transceiver 112, and a display device 116. The processor 108 can operate to display the three-dimensional model of a conveyor system on the display device 116 via the transceiver 112. For example, the transceiver 112 can wirelessly communicate (e.g., via Bluetooth®, Wi-Fi™, etc.) to transmit electrical signals to the display device 116. In other constructions, the display device 116 may be physically coupled for transmitting electrical signals rather than wirelessly. Some or all of the memory device 104, the processor 108, and the transceiver 112 can be incorporated in a personal computer and/or a server operating on a network. The display device 116 can be in the form of eyewear (e.g., goggles, glasses, etc.) to be worn on the face of a human user. As such, the display device 116 can include a transparent or semi-transparent display area that allows the user to see through to the real physical surroundings. Examples of such devices can include a variety of so-called "smart glasses" or AR glasses such as Google Glass™, Epson Moverio BT-100™, Microsoft HoloLens™, or Sony SmartEyeglass™ among others. The display device 116 can also include a forward-facing camera or multiple cameras including at least one forward-facing camera to collect optical data of the real physical environment in front of the human user when wearing the display device 116. In some constructions, this allows for a display area of the display device 116 to be partially or fully opaque, with an electronically generated display operable to display a combined view of the real physical environment from the optical data along with the virtual three-dimensional model of the conveyor system. Such a system operates closer in principal to virtual reality (VR), however, the objective remains to allow the user to interact with and view the real physical environment and not to transport the user out of the real physical environment. It should be noted that in some embodiments, one or more cameras (described above) of the AR system 100 can be in other locations on the user's body, such as any suitable body-mounted camera located in the user's head, shoulder, arm chest, and the like.

As an alternative to eyewear, the display device 116 can take the form of a tablet computer, a smart phone, or other personal electronic device. Similar to the description above, the display area, or screen, of such a device can be operated to show a combined view of the real physical environment (e.g., produced by optical data from a forward-facing camera) along with the three-dimensional model of the conveyor system. When such a handheld device is used, it becomes a portal for viewing the three-dimensional model of the conveyor system placed into the real physical environment.

Whether the display device 116 takes the form of eyewear or a handheld electronic device, the processor 108 is operable to display a three-dimensional image or "model" 124 of the conveyor system at a predetermined location within the real physical environment. As used herein and in the appended claims, the term "model" is a shorthand way to refer to the virtual conveyor system that is rendered to the user so that the user sees the conveyor system as if it is physically present, allowing the user to move around, along, and optionally into the virtual conveyor system. Although the model can be a CAD model created in any manner and having any file format, the term "model" is not limited to CAD models and related data, and can instead be or include other objects and artifacts retrieved and displayed by the processor 108 upon the display device 116, such as one or more images of real equipment displayed upon the display device 116.

The location of display of the model 124 can be initially fixed to allow the user to walk around, through, and/or into the conveyor system as if it were present in the real physical environment, but the location may be movable by the user as well. In the illustrated example of FIG. 1, the conveyor system of the three-dimensional model 124 includes a workstation (e.g., an enclosed workstation such as an oven) 128, a movable doorway 132 that can be opened and closed, a control station 134 and at least one conveyor track 136 supporting one or more work pieces 140. Although the real physical environment of the model 124 may vary widely depending upon the building site, type of conveyor system installation, etc., the environment can be an industrial building having a floor 144, at least one wall 146 extending upwardly from the floor 144, and a ceiling structure 148 consisting of ceiling panels, beams, rafters, etc. Although not shown, the real physical environment can also include other machines, work stations, equipment, or conveyor devices present at a particular industrial site. For example, the industrial site may be in the process of initial installation or setup, or rebuilding, refurbishment, or repurposing. The industrial building can include any number of fixed utility features (e.g., drain 152A, a fluid source 152B, an electrical source 152C, ventilation elements 152D, 152E) or other features such as a doorway, a storage facility, handling equipment, a railing, a walkway, etc. In the illustrated construction, the floor 144 includes at least one drain 152A leading to a waste collection system. Along the wall 146, the illustrated industrial building includes a fluid source 152B (e.g., a line and/or junction for supplying water, hydraulic fluid, or a gas) and an electrical source 152C (e.g., electrical line and/or junction box). Further, the wall 146 and/or the ceiling structure 148 can include one or more ventilation elements 152D, 152E such as fresh air inlets, air outlets, or air return/delivery duct openings of an air handling system, which may optionally include air treatment devices (e.g., filters or other decontamination devices).

Figure 1:
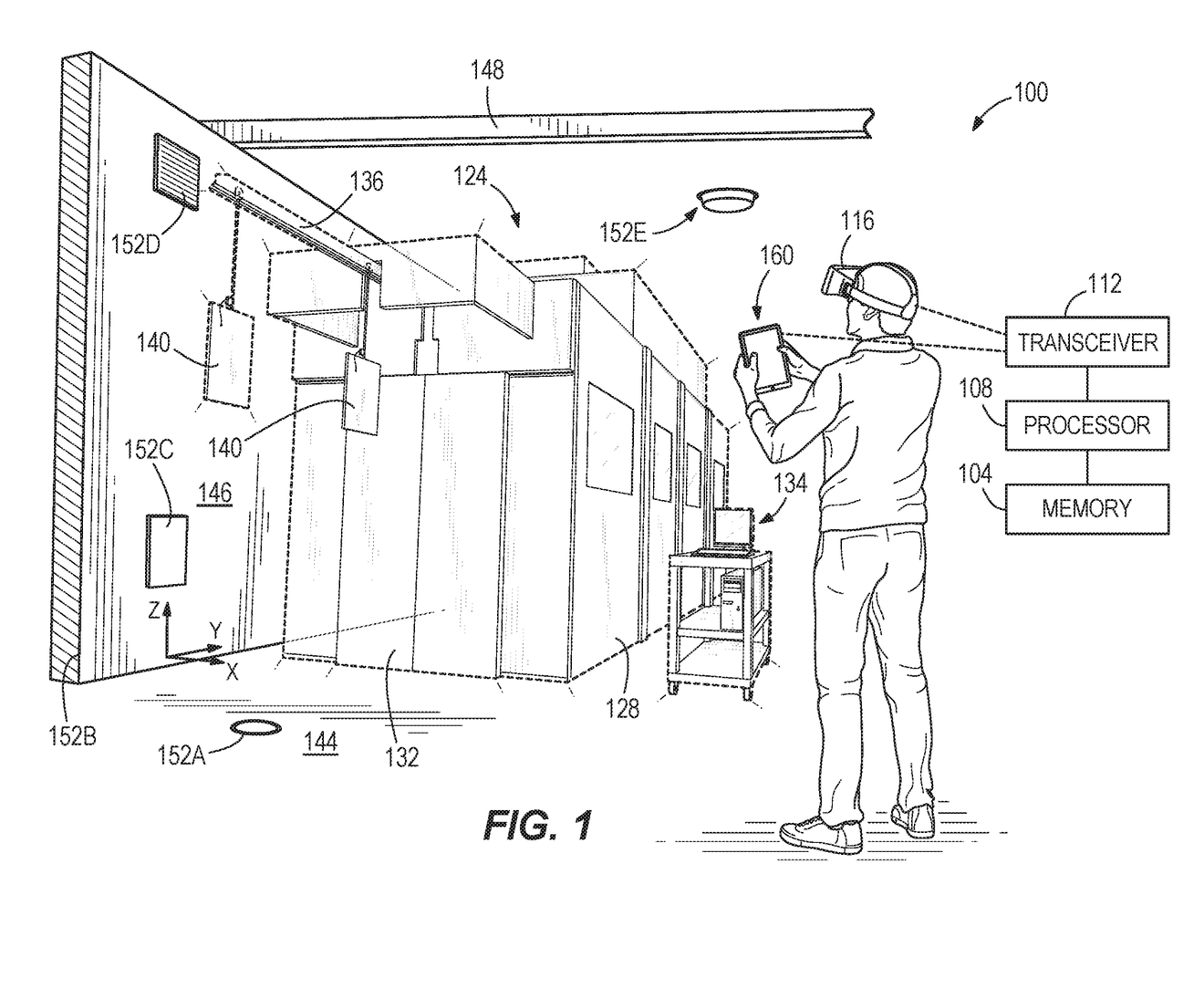
FIG. 1 is a schematic view of an augmented reality system according to one aspect of the invention, displaying a first conveyor system model for interaction with the user.

When the model 124 of the conveyor system is displayed in the real physical environment (e.g., building) in which it is to be installed, many advantageous features or operations become available to the user. Prior to or during early stages of any physical construction of the conveyor system at the real physical building location, display and interaction with the model 124 allow the user to gain additional insights and understanding of the effects of physically installing the conveyor system according to the model 124 at a particular location in the real physical environment. In addition to observing the model 124, the user may interact with the model 124 in any one or more of a variety of ways, some of which are described in further detail below. It is also noted that observing or inspecting the conveyor system model 124 can include stepping inside a virtual interior of the conveyor system model 124.

In order to interact with the model 124, the AR system 100 can include a user interface 160 as illustrated in FIG. 1. The user interface 160 can be a physical handheld device having any one or more of: buttons, knobs, joysticks, dials, touch pads or other types of human machine interface elements. In constructions where the display device 116 is not eyewear, but rather a personal electronic device with a screen, the user interface can form part of the image displayed on the screen. In constructions where the display device 116 is eyewear, the eyewear can include all or a portion of the user interface 160 by way of any one or more human machine interface elements integrated into the display device 116 (e.g., along the sides near the user's temples, above the eyes, etc.). In yet other constructions, some or all of the human machine interface elements are not physical elements, but control elements operable to interface with the processor 108 through voice commands and/or gestures from the user. The user interface 160 can be coupled in communication with the processor through the transceiver 112 (e.g., wirelessly), or the user interface 160 can be directly coupled to or integrated with the processor 108. In some embodiments, the user interface 160 is or includes a brain-computer interface enabling a user to perform one or more functions described herein. Such brain-computer interfaces can include a helmet or headgear wearable by the user, and in some embodiments is integrated into or part of the display device 116 also worn by the user.

In one aspect, a method of using the AR system 100 includes moving the model 124 within the real physical environment. In a first step, the model 124 is displayed at a predetermined location within the real physical environment. The user can then view and/or inspect features or portions of the model 124 as displayed in the real physical environment in the predetermined location. The user can then use the user interface 160 to move the model in any one or more of the X-direction, the Y-direction, and the Z-direction by inputting a movement command. The processor 108 refreshes the model 124 to be re-presented at the newly defined location. The user can then view and/or inspect features or portions of the model 124 in the new location with respect to the real physical environment. In some aspects, the AR system 100 may enable the model 124 to be moved continuously in real time as the user operates the user interface 160, as an alternative to inputting a movement command consisting of X, Y, and Z coordinate movement amounts. The AR system 100 may also enable the user to alter the configuration of the model 124 of the conveyor system. For example, the user may provide inputs to the user interface 160 to reconfigure, add, or remove individual modules or work stations within the conveyor system represented by the model 124.

In some aspects, whether or not the user operates the AR system 100 to move the model 124 to different locations within the real physical environment or re-configure the conveyor system of the model 124, the user may perform a detailed inspection, noting clearances and/or interferences between the model 124 and features of the real physical environment. The user may physically measure (e.g., with a tape measure, ruler, etc.) such clearance or interference distances. For example, the user can measure a distance from the model 124 to one or more of the fixed utility features 152A to 152E or to other features or equipment such as other work stations, storage facilities, handling equipment, railings, walkways, etc. The relative positions and/or orientations between the model 124 of the conveyor system and other models or real physical environment features can also be inspected while the model 124 is displayed in the real physical environment. When relating features of the real physical environment to features of the model 124, the AR system 100 may enable the user to virtually identify, select, or target certain features of the real physical environment and/or features of the model 124 by applying "tags". Applying a tag can include selecting the location of the desired feature(s) with a pointer or by moving a crosshair for example. Once tagged, the processor 108 may automatically calculate a spacing or interference distance measurement, which can be displayed and/or saved to the memory 104 for later reference. With tags applied, the AR system 100 may further enable the user to reposition the model 124, or reconfigure at least a portion of the model 124, according to a user defined value for a minimum or maximum proximity from one or more of the building features such as the fixed utility features 152A to 152E.

Figure 6:
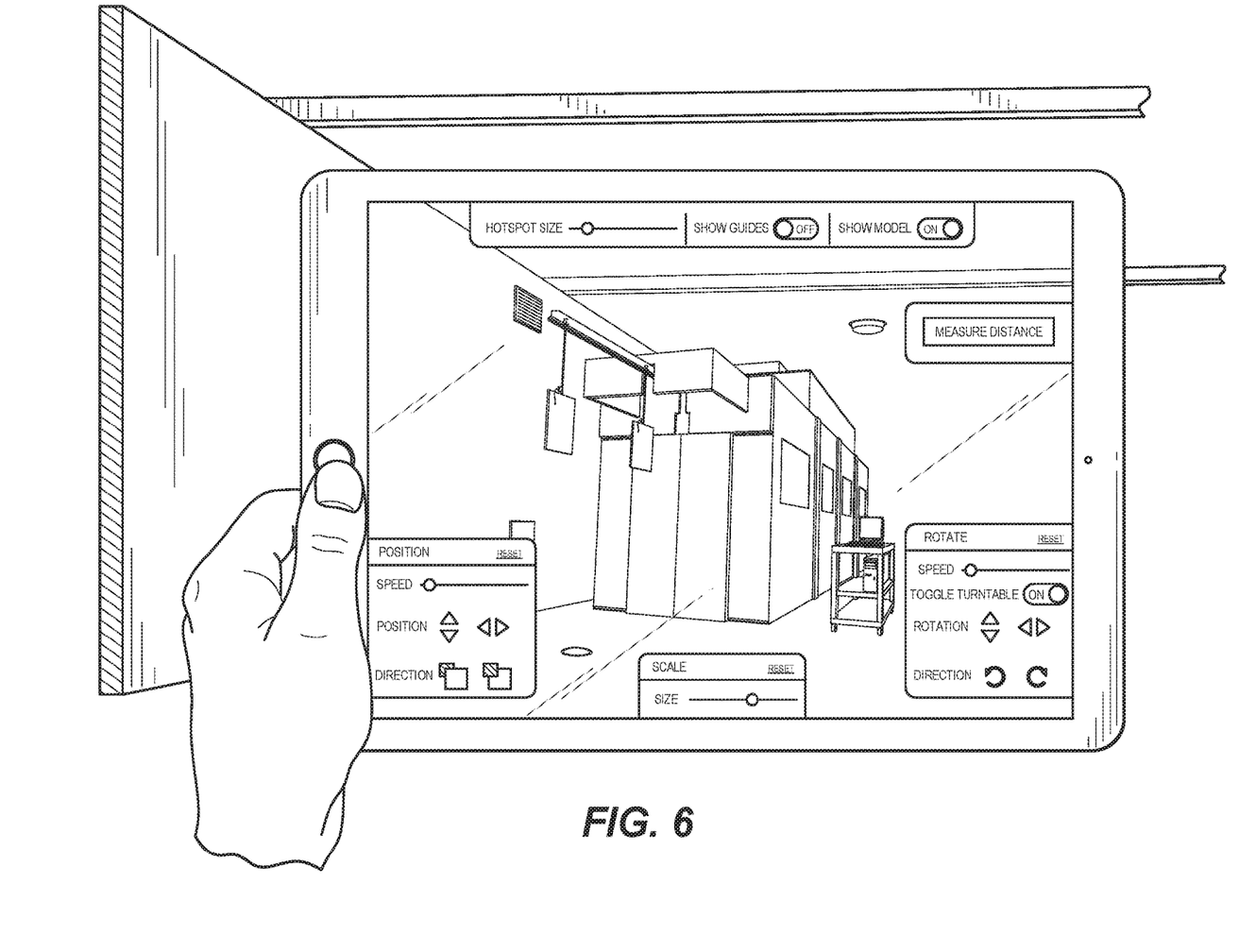
FIG. 6 illustrates a user interface including various applets for the user to interact with the augmented reality system.

As shown in FIG. 6, the user interface 160 can include various applets for the user to interact with the AR system 100. Across the top of the display, a first set of applets control the display size of hotspots (e.g., with a slider control), the showing of guides (e.g., on/off), and the showing of the model 124 (e.g., on/off), respectively. Hotspots can refer to tagged areas of the model 124 that may provide access to further information and/or functionality within the AR system 100. In accordance with the above description regarding measurements, another applet is provided to measure distances. Further, additional applets are provided for positioning, scaling, and rotating the displayed model 124. The positioning applet can include a speed slider control, one or more groups of position arrows that move the displayed model 124 along perpendicular axes in accordance with the selected speed, and a pair of direction buttons that adjust the proximity, i.e., bringing the model 124 closer or moving it farther away. The scale applet can be provided in the form of a slider control that increases or decreases the model scale. The rotation applet can include a speed slider control, a turntable toggle (e.g., on/off), one or more rotation arrows, and a set of turntable direction buttons (e.g., clockwise/counterclockwise). When the turntable toggle is off, the model 124 is displayed in single location and does not move unless adjusted, for example, by rotating about perpendicular pitch and yaw axes with the rotation arrows. This is separate and additional to the position controls, which translate the displayed model 124. Finally, when the turntable toggle is on, the model 124 will rotate clockwise or counterclockwise so that the user(s) do not have to move around the model 124 to obtain different perspectives. The turntable mode may rotate the model 124 continuously, and the speed of rotation may be set by the speed slider control. The turntable direction buttons change the direction of rotation in turntable mode.

In some aspects, either in combination with operations described above or separately, the user may put the conveyor system of the model 124 into virtual operation. For example, the user may interact with the model 124 directly (e.g., virtually operating controls of the control station 134) or indirectly through the user interface 160, according to any of the embodiments or command types discussed above. Accordingly, operating the conveyor system of the model 124 can include any one or more of: starting conveying, stopping conveying, moving work pieces 140 into and out of enclosures (e.g., furnace, coating booth, drying kiln) of the model 124, changing a speed of conveyance, loading work pieces 140, unloading work pieces 140, changing among various sizes/shapes of work pieces 140. Operating the conveyor system of the model 124 can optionally further include simulating a process by which one or more work pieces 140 are dipped into an immersion tank and lifted therefrom (e.g., electrocoating or at autodeposition bath). Such a virtual operation of the model 124 can also include tilting and/or rotating the one or more work pieces 140 to one or more alternate orientations. The axis or axes of movement can be predefined features of the conveyor system, or may be selectable by the user during interaction with the model 124 while using the AR system 100. In one particular method, the user can command starting of conveyance of one or more work pieces 140, and the user can physically walk along with the work piece 140 as it is conveyed through a work station or a series of work stations defining a process (e.g., finishing, cleaning, coating, painting, etc.). The AR system 100 can enable the user to identify a position and a path of work pieces 140 with respect to the real physical environment (e.g., any of the fixed utility features 152A to 152E) as the work pieces 140 move along the virtual conveyor system. The AR system 100 may further be operable to make adjustments to the characteristics of the model 124 during the interaction with the display device 116. As non-limiting examples, any of the following may be adjusted by the user: conveyor height, work piece size or shape, line density of work pieces along the conveyor, and work station (e.g., oven, tank, booth) height, length, and/or width.

Figure 2:
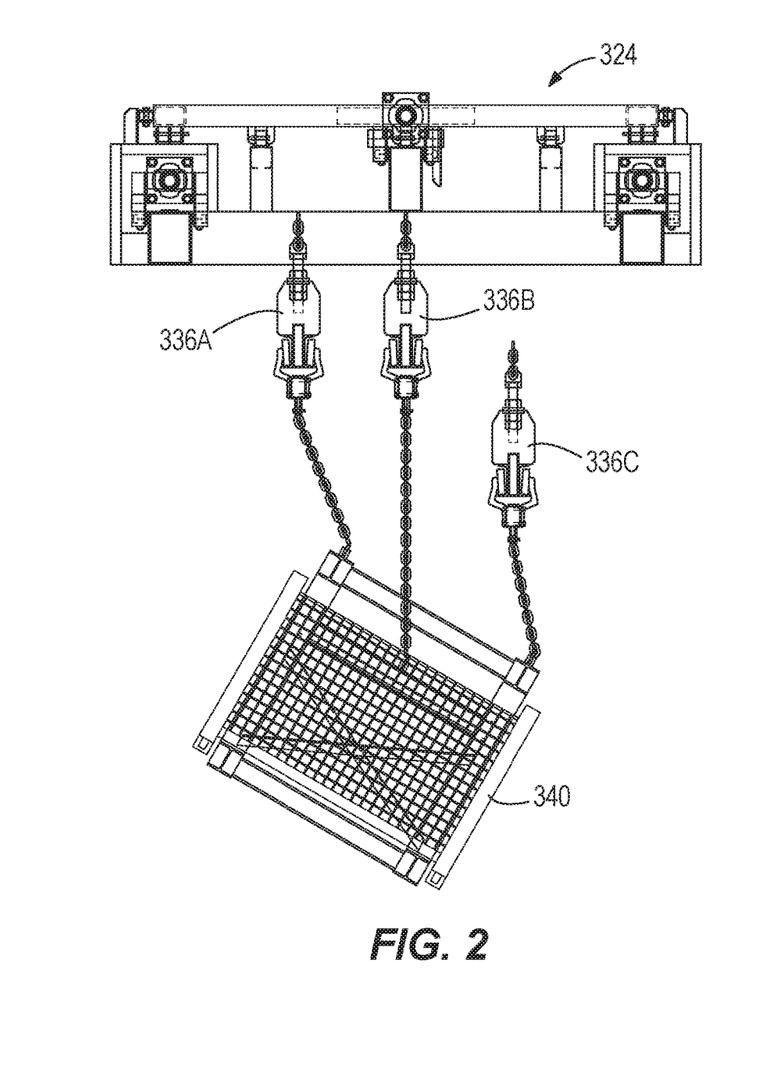
FIGS. 2-5 illustrate a second conveyor system model displayed by the augmented reality system, the second conveyor system being shown in a variety of operational states during virtual operation.
Figure 3:
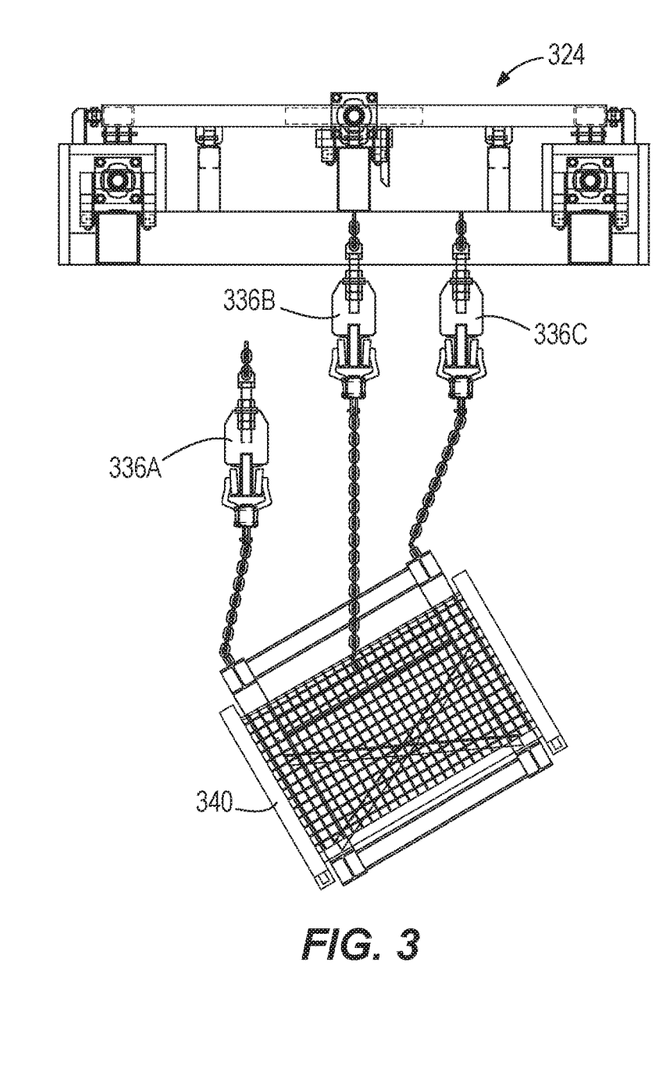
Figure 4:
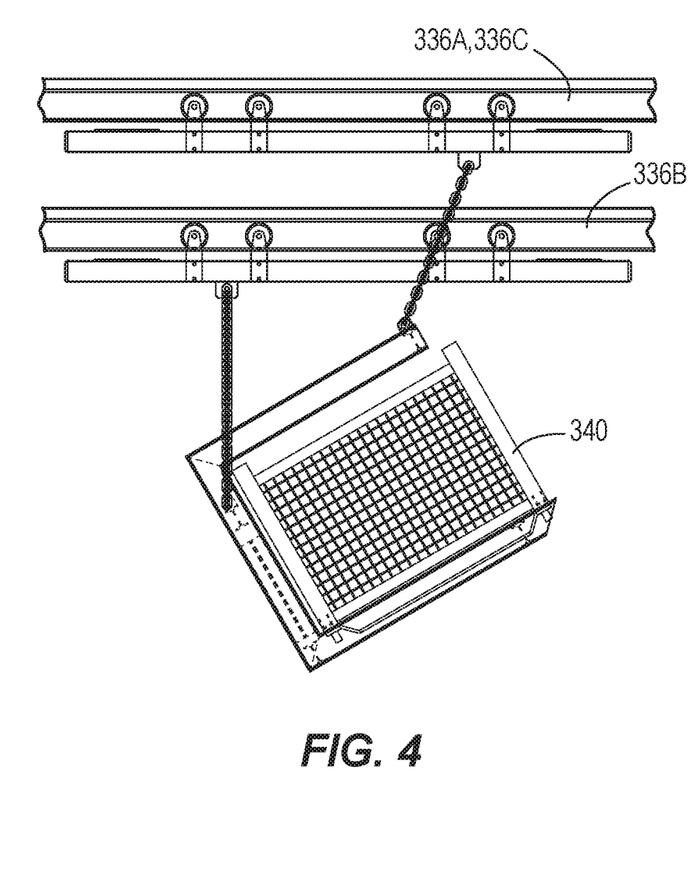
Figure 5:
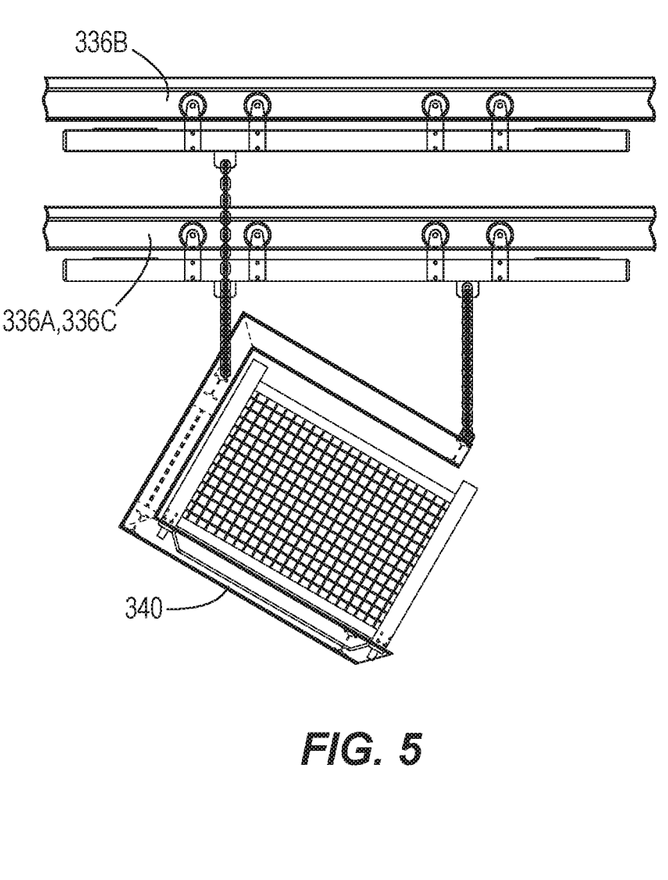

FIGS. 2-5 illustrate another type of conveyor system that can be displayed and interacted with via the AR system 100. The conveyor system can take the form of that disclosed in U.S. Pat. No. 9,468,944. This additional embodiment provides perspective on additional ways of operating the AR system 100, but by no means is the invention limited to the exact types of conveyor systems shown in the drawings. The conveyor system of FIGS. 2-5 includes three parallel conveyor tracks 336A to 336C that support a work piece 340 by suspending three points of the work piece 340 from the respective conveyor tracks 336A to 336C. The work piece 340 in this embodiment is a liquid permeable container or basket that may be used to carry a plurality of smaller manufactured items for processing (e.g., cleaning, finish application by autodeposition or e-coating). Reference number 324 indicates the model created by the display device 116 of the AR system 100 from a three-dimensional model of the conveyor system. One or more of the conveyor tracks 336A to 336C virtually embodied by the model 324 can be individually movable for vertical travel relative to the others to impart various tilting operations of the work piece 340. The tilting operations can include tilting laterally left and right as shown in FIGS. 2 and 3, or tilting fore and aft as shown in FIGS. 4 and 5 (directions identified relative to the direction of extension of the conveyor tracks 336A to 336C and likewise the conveyed travel of the work piece 340).

Methods of operating the AR system 100 with the model 324 can include any or all of the steps described above with respect to the model 124, including measuring, moving, reconfiguring, and controlling virtual operation. Measuring, for example, can include first virtually operating the conveyor system model 324 into a particular state of operation, and then measuring between a tagged portion of the model 324 and a feature of the real physical building in which the model 324 is displayed. Virtual operation of the conveyor system model 324 can include manipulating individual ones of the conveyor tracks 336A to 336C with respect to the others to impart a tilting of the work piece 340. Because the position and orientation of the work piece 340 changes with respect to one or more of the conveyor tracks 336A to 336C during such operations, it may be particularly beneficial for the user to be able to make observations, inspection, and/or measurements based on a particular phase or state of the virtual operation of the conveyor system.

In some embodiments, the AR system 100 enables two or more individuals, each having a respective display device 116, to operate the AR system 100 simultaneously. In such embodiments, the display devices 116 can communicate with respective processors 108 and/or memory devices 104, or can share (e.g., communicate with, receive and/or transmit information, etc.) a common processor 108 and/or memory device 116. Also, in such embodiments, the users can have the same or different types of display devices 116, and can operate in any desired respective locations in the real environment. The ability of multiple users with respective display devices operating in the same environment enables users to cooperate in viewing, moving, or modifying the model as desired, and in understanding aspects and features of the model.

Some embodiments of the AR system 100 can also enable one or more users to operate the system 100 using VR display devices (not shown), in which the such display devices do not necessarily enable the VR display device users to see the real environment in addition to the model information being displayed as described above. However, even in cases where one or more users can only see, move about, manipulate and/or control the model data on their VR displays (i.e., without seeing the surrounding real environment), this capability still enables users to join in an operating session of the AR system 100 with AR display device users while being remote from the real-world location. In such cases, the remote users using VR display devices can participate using respective display devices, transceivers, and memory devices in communication with one or more other processors 108 of the local AR participants, such as over the internet or any computer network.

In some embodiments, the information viewed by a user of the AR system 100 (i.e., through any of the AR display devices 116 described above) can also be simultaneously viewed on one or more other display devices. In such cases, the model being displayed on the AR display device 116 is also transmitted to and simultaneously displayed upon the other display device(s), which can be local or remote with respect to the real-world environment in which the model is being displayed, such as over any suitable network or over the internet. In such cases, the real-world environment viewed by the AR display device user can also be captured, transmitted, and simultaneously viewed by another user on any local or remote display device over the same connection(s) by one or more cameras on the AR display device 116. Such cameras can simultaneously capture video of the real world environment viewed by the AR display device in which the model is being displayed. In this manner, another local or remote user viewing any display device (e.g., a computer screen, AR or VR display device, and the like) can see what one of the AR display system users is seeing (i.e., the model and the real-world environment) through that user's AR display device 116, and can do so in real-time or near real-time over one or more computer networks and/or the internet. This capability enables individuals to observe what the AR system user is seeing, doing, and experiencing in the AR environment.

What is claimed is:

1. An augmented reality system comprising:
   a display device defining a display area;
   a database containing a three-dimensional model of a conveyor system;
   a communication link between the database and the display device;
   a processor operable to display the three-dimensional model of the conveyor system on the display area, wherein the display allows a human user to see a real time combined view of the real physical environment, including a building and features thereof, and the three-dimensional model of the factory automation system within the building; and
   a user interface having controls operable to effect a movement of the displayed conveyor system within the building and controls that are operable to tag a feature of the displayed conveyor system and perform a measurement between the tagged feature and a feature physically present in the building.

2. The augmented reality system of claim 1, wherein the display device includes eyewear, and the display area is transparent or semi-transparent.

3. The augmented reality system of claim 1, wherein the electronic communication link is established through a wireless network.

4. The augmented reality system of claim 1, wherein the user interface has at least one control operable to effect starting of virtual operation of the displayed conveyor system.

5. The augmented reality system of claim 1, wherein the user interface is provided on the display device.

6. The augmented reality system of claim 5 wherein the display device includes eyewear.

7. The augmented reality system of claim 1, wherein the display device is a handheld personal electronic device.

8. A method of operating an augmented reality system in a building, the method comprising:
   providing a display device to a human user in the building, the display device defining a display area;

displaying a three-dimensional model of a conveyor system to the human user, while simultaneously allowing the human user to see real physical features of the building in real time to give the impression that the conveyor system is installed in the building, wherein displaying the three-dimensional model of the conveyor system includes presenting a conveyor system control panel;

starting virtual operation of the displayed conveyor system in response to a command from the user via an input to a user interface; and tagging a feature of the displayed conveyor system and measuring between the tagged feature and a feature physically present in the building.

9. The method of claim 8, wherein the user interface is a remote physical device separate from the display device.

10. The method of claim 8, wherein the user interface is provided on the display device.

11. The method of claim 8, wherein the input is a gesture or voice command.

12. The method of claim 8, further comprising changing at least one parameter of the virtual operation of the displayed conveyor system in response to a further input to the user interface, the at least one parameter being selected from a group consisting of: changing a work piece handled by the conveyor system, changing a position of a work piece relative to a conveyor track of the conveyor system, changing an orientation of a work piece relative to a conveyor track of the conveyor system, changing a speed of conveyance, or changing a path of conveyance.

13. A method of operating an augmented reality system in a building, the method comprising:

providing a display device to a human user in the building, the display device defining a display area;

displaying a three-dimensional model of a conveyor system to the human user, while simultaneously allowing the human user to see real physical features of the building in real time to give the impression that the conveyor system is installed in the building;

tagging a feature of the three-dimensional model of the conveyor system with a user interface;

performing with the user interface a measurement between the tagged feature of the three-dimensional model and at least one utility feature of the building; and performing with the user interface a movement of at least a portion of the displayed three-dimensional model to a new position within the building.

14. The method of claim 13, further comprising starting and stopping a virtual operation of the displayed conveyor system in response to one or more inputs from the human user to the user interface.

15. The method of claim 13, further comprising manipulating one or more parameters of the displayed conveyor system with a gesture or voice command.

16. The method of claim 13, further comprising calculating with a processor a clearance or interference between the tagged feature of the three-dimensional model and the at least one utility physical feature of the building.

17. The method of claim 13, wherein the display device is provided as eyewear, and the three-dimensional model of the conveyor system is displayed on a transparent or semi-transparent portion of the display area to provide a direct view of the real physical features of the building.

18. The method of claim 13, wherein the three-dimensional model of the conveyor system is displayed on the display area along with a computer-generated view of the real physical features of the building.

* * * * *